United States Patent [19]

Kawanishi

[11] Patent Number: 5,608,025
[45] Date of Patent: Mar. 4, 1997

[54] METHACRYLIC COPOLYMERS AND DISPERSANTS FOR PIGMENTS USED IN NON-AQUEOUS PAINTS AND VARNISHES COMPRISING THE COPOLYMERS

[75] Inventor: Wataru Kawanishi, Nara, Japan

[73] Assignee: Kyoeisha Chemical Co., Ltd., Japan

[21] Appl. No.: 613,695

[22] Filed: Mar. 11, 1996

[30] Foreign Application Priority Data

Mar. 16, 1995 [JP] Japan .................................. 7-057010

[51] Int. Cl.$^6$ ........................ C08F 226/00; C08F 220/10
[52] U.S. Cl. ........................................ 526/312; 526/328.5
[58] Field of Search ................................ 526/312, 328.5

[56] References Cited

U.S. PATENT DOCUMENTS 5,225,505  7/1993  Wiegert .................................. 526/245

FOREIGN PATENT DOCUMENTS 0269456  6/1988  European Pat. Off. .
0491169  6/1992  European Pat. Off. .
2029429  3/1980  United Kingdom .

Primary Examiner—Joseph L. Schofer
Assistant Examiner—Wu C. Cheng
Attorney, Agent, or Firm—Parkhurst, Wendel & Burr, L.L.P.

[57] ABSTRACT

Herein disclosed are a novel methacrylic copolymer capable of serving as a component for uniformly dispersing pigments in paints and varnishes and a dispersant comprising the copolymer. The dispersant for dispersing pigments in non-aqueous paints and varnishes comprises a methacrylic copolymer obtained by copolymerizing 10 to 85 parts by weight of at least one (meth)acrylate monomer selected from, for instance, alkyl (meth)acrylates, alkenyl (meth)acrylates, hydroxyalkyl (meth)acrylates and alkylalkenyl monoalkylene glycol (meth)acrylates, 10 to 60 parts by weight of aminoalkyl (meth)acrylate monomer and/or quaternary ammonium (meth)acrylate monomer and 5 to 30 parts by weight of a monomer carrying a terminal (meth)acryloyl group and having an average molecular weight ranging from 4000 to 1000000.

4 Claims, No Drawings

METHACRYLIC COPOLYMERS AND DISPERSANTS FOR PIGMENTS USED IN NON-AQUEOUS PAINTS AND VARNISHES COMPRISING THE COPOLYMERS

BACKGROUND OF THE INVENTION

The present invention relates to a methacrylic copolymer as a novel compound and a dispersant for pigments used in non-aqueous paints and varnishes comprising the copolymer.

The non-aqueous paints and varnishes comprise a pigment. The pigments should uniformly be dispersed within the paints and varnishes in order to ensure the formation of coated films free of any mottle. There has been known a method in which a polymer is added to paints and varnishes as a means for ensuring uniform dispersion of a pigment therein. Examples of such methods include those comprising incorporating an urethane compound carrying an amino group into paints and varnishes as disclosed in Japanese Patent Provisional Publication Nos. 62-70459, 1-135526 and 1-139132; methods comprising adding, to paints and varnishes, an isocyanate-modified acrylic polymer as disclosed in Japanese Patent Provisional Publication Nos. 63-51487 and 62-81459; and a method comprising adding, to paints and varnishes, a phosphoric acid ester derivative as disclosed in Japanese Patent Provisional Publication Nos. 63-51469.

However, the foregoing polymers are simply effective for a part of pigments and accordingly, it takes a long period of time for uniformly dispersing a pigment, in particular, carbon black having strong cohesion. When paints and varnishes comprising carbon black are stored over a long period of time, the pigment dispersed therein may sometimes cause reaggregation. For this reason, the resulting coated film may sometimes suffer from problems of mottle and reduced gloss.

SUMMARY OF THE INVENTION

The present invention has been developed for solving the foregoing problems and accordingly, an object of the present invention is to provide a novel methacrylic copolymer serving as an effective component for uniformly dispersing a pigment in paints and varnishes as well as a dispersant which comprises the copolymer.

The foregoing object of the present invention can be accomplished by providing a methacrylic copolymer which is a polymer comprising repeating units derived from the following monomers:

(A) at least one (meth)acrylate monomer selected from the group consisting of alkyl (meth)acrylates each carrying an alkyl group having 1 to 18 carbon atoms; alkenyl (meth)acrylates each carrying an alkenyl group having 1 to 18 carbon atoms; hydroxyalkyl (meth)acrylates each carrying an alkyl group having 2 to 4 carbon atoms; alkyl monoalkylene glycol (meth)acrylates and alkyl polyalkylene glycol (meth)acrylates each carrying an alkyl group having 1 to 18 carbon atoms; alkenyl monoalkylene glycol (meth)acrylates and alkenyl polyalkylene glycol (meth)acrylates each carrying an alkenyl group having 1 to 18 carbon atoms; and alkylalkenyl monoalkylene glycol (meth)acrylates and alkylalkenyl polyalkylene glycol (meth)acrylates each carrying an alkylalkenyl group having 1 to 18 carbon atoms;

(B) an aminoalkyl (meth)acrylate monomer represented by the following Formula (I):

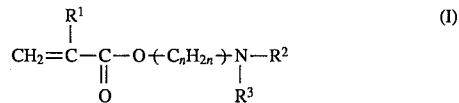

and/or a quaternary ammonium (meth)acrylate monomer represented by the following Formula (II):

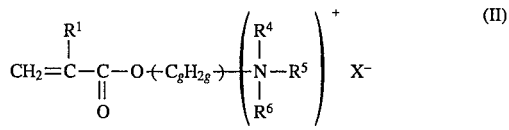

(C) at least one monomer selected from the group consisting of polyalkyl (meth)acrylate macromonomers, polyalkenyl (meth)acrylate macromonomers, polyester macromonomers and polystyrene macromonomers, each carrying a terminal (meth)acryloyl group;

the copolymer having a content of the moieties derived from the monomer (A) ranging from 10 to 85 parts by weight, a content of the moieties derived from the monomer (B) ranging from 10 to 60 parts by weight and a content of the moieties derived from the monomer (C) ranging from 5 to 30 parts by weight and a number-average molecular weight ranging from 4000 to 1000000.

In Formula (I), $R^1$ represents a hydrogen atom or a methyl group, $R^2$ and $R^3$ each represents a hydrogen atom or an alkyl group having 1 to 6 carbon atoms and n is an integer ranging from 2 to 8.

In Formula (II), $R^4$, $R^5$ and $R^6$ which are different from one another and each may represent an alkyl group having 1 to 6 carbon atoms, a hydroxyalkyl group having 2 to 6 carbon atoms, an alkoxyalkyl group having 1 to 4 carbon atoms, a cycloalkyl group, an aralkyl group, a phenyl group or a phenyl group substituted with other atoms; $X^-$ represents a halide ion or an anionic residue of an acid; and g is an integer ranging from 2 to 8.

Specific examples of alkyl (meth)acrylate and alkenyl (meth)acrylate monomers as the monomer component (A) include methyl (meth)acrylate, ethyl (meth)acrylate, n-propyl (meth)acrylate, isopropyl (meth)acrylate, n-butyl (meth)acrylate, isobutyl (meth)acrylate, hexyl (meth)acrylate, 2-ethylhexyl (meth)acrylate, isodecyl (meth)acrylate, lauryl (meth)acrylate, cyclohexyl (meth)acrylate, stearyl (meth)acrylate, benzyl (meth)acrylate and isobornyl (meth)acrylate. Specific examples of hydroxyalkyl (meth)acrylate monomers are hydroxyethyl (meth)acrylate, 2-hydroxypropyl (meth)acrylate and 2-hydroxybutyl (meth)acrylate. Specific examples of alkyl monoalkylene glycol (meth)acrylate, alkyl polyalkylene glycol (meth)acrylate, alkenyl monoalkylene glycol (meth)acrylate, alkenyl polyalkylene glycol (meth)acrylate, alkylalkenyl monoalkylene glycol (meth)acrylate and alkylalkenyl polyalkylene glycol (meth)acrylate monomers are methoxy diethylene glycol (meth)acrylate, methoxy propylene glycol (meth)acrylate, n-butoxy ethylene glycol (meth)acrylate, 2-phenoxyethyl (meth)acrylate and trioxyethylene nonyl phenol (meth)acrylate.

Specific examples of aminoalkyl (meth)acrylate monomers belonging to Group (B) represented by Formula (I) are N,N-dimethylaminoethyl (meth)acrylate, N,N-diethylaminoethyl (meth)acrylate, N-tert-butylaminoethyl (meth)acrylate, N,N-dimethylaminopropyl (meth)acrylate, N,N-dimethylaminobutyl (meth)acrylate, N-propylaminoethyl (meth)acrylate and N-butylaminoethyl (meth)acrylate. The quaternary ammonium (meth)acrylate monomer represented by Formula (II) is a monomer carrying one quaternary ammonium group and one (meth)acryloyl group in the molecule. Specific examples thereof are 2-hydroxy-3-(meth-)acryloxypropyl trimethylammonium chloride, 2-hydroxy-3-(meth)acryloxypropyl triethanolammoniumchloride, 2-hydroxy-3-(meth)acryloxypropyl dimethylbenzylammonium chloride, 2-hydroxy-3-(meth)acryloxypropyl dimethylphenylammonium chloride, (meth)acryloxyethyl trimethylammonium chloride and (meth)acrylamidopropyl trimethylammonium chloride. In this connection, $X^-$ is not restricted to $Cl^-$ and therefore, the specific examples of the aminoalkyl (meth)acrylate monomers may be monomers such as those listed above comprising $Br^-$, $I^-$, $F^-$, $HSO_4^-$, $SO_4^{2-}$, $NO_3^-$, $PO_4^{3-}$, $HPO_4^{3-}$, $H_2PO_4^-$, $C_6H_5SO_3^-$ or $OH^-$ instead of $Cl^-$.

Specific examples of the polyalkyl (meth)acrylate macromonomers, polyalkenyl (meth)acrylate macromonomers, polyester macromonomers and polystyrene macromonomers, each carrying a terminal (meth)acryloyl group as the monomers (C) are Macromonomer AA-6 (terminal group: methacryloyl group; segment: methyl methacrylate; number-average molecular weight: 6000; available from Toagosei Chemical Industry Co., Ltd.), Macromonomer AW-6S (terminal group: methacryloyl group; segment: isobutylmethacrylate; number-average molecular weight: 6000; available from Toagosei Chemical Industry Co., Ltd.), Macromonomer AB-6 (terminal group: methacryloyl group; segment: butyl acrylate; number-average molecular weight: 6000; available from Toagosei Chemical Industry Co., Ltd.) and Macromonomer AS-6 (terminal group: methacryloyl group; segment: styrene; number-average molecular weight: 6000; available from Toagosei Chemical Industry Co., Ltd.).

The methacrylic copolymers can be prepared by the solution polymerization. More specifically, such a methacrylic copolymer is produced by polymerizing a monomer (A), a monomer (B) and a monomer (C) in the presence of a polymerization initiator in an appropriate inert solvent. The reaction temperature preferably ranges from 70° to 150° C. and more preferably 80° to 130° C. and the reaction time desirably ranges from 1 to 15 hours, in particular, 4 to 8 hours.

Examples of such polymerization initiators usable herein are azo compounds such as azobisisobutyronitrile and dimethylazobisisobutyrate; and organic peroxides such as lauroyl peroxide and diisopropylbenzene hydroperoxide.

Preferably, solvents usable herein are those capable of dissolving the resulting methacrylic copolymers and likewise miscible with, for instance, paints and varnishes (hereinafter simply referred to as "paint(s)") and inks. Specific examples thereof include aromatic solvents such as xylene, Solvesso 100 and Solvesso 150; ketone type solvents such as methyl isobutyl ketone; ester type solvents such as ethyl acetate and butyl acetate; cellosolve type solvents such as butyl cellosolve and ethyl cellosolve; propylene glycol type solvents such as propylene glycol monomethyl ether; cellosolve acetate type solvents such as ethylene glycol monoethyl ether acetate; and propylene glycol monoalkyl ether acetate type solvent such as propylene glycol monomethyl ether acetate. These solvents may be used alone or in any combination.

The dispersant for pigments used in non-aqueous paints and varnishes according to another aspect of the present invention comprises the foregoing methacrylic copolymer. More specifically, the dispersant for pigments is a solution of the foregoing methacrylic copolymer prepared by a polymerization reaction of 10 to 85 parts by weight of a monomer (A), 10 to 60 parts by weight of a monomer (B) and 5 to 30 parts by weight of a monomer (C), dissolved in a solvent such as xylene.

If the content of the monomer (A) in the methacrylic copolymer is less than 10 parts by weight, the solubility of the copolymer in a resin for paints is insufficient and the applicability of the copolymer to paints is greatly restricted. On the other hand, if it exceeds 85 parts by weight, the use of the resulting copolymer impairs the dispersion rate and the dispersion stability of pigments. If the content of the monomer (B) in the methacrylic copolymer is less than 10 parts by weight, the resulting copolymer is insufficient in the affinity for pigments and accordingly, cannot completely disperse the pigments in paints, while if it exceeds 60 parts by weight, the resulting paints can simply provide coated films having low water resistance and low corrosion resistance. Finally, if the content of the monomer (C) in the methacrylic copolymer is less than 5 parts by weight, the resulting copolymer cannot completely disperse pigments in paints, while if it exceeds 30 parts by weight, the dispersion rate of pigments in paints is rather reduced.

The number-average molecular weight of the monomer (C) preferably ranges from 2000 to 20000. This is because if it is less than 2000, the copolymer has a tendency to decrease the dispersion stability of pigments. On the other hand, if it exceeds 20000, the resulting dispersant has an extremely high viscosity and cannot be practically used.

The number-average molecular weight of the methacrylic copolymer preferably ranges from 4000 to 1000000. This is because if the average molecular weight thereof is less than 4000, the physical properties of the resulting coated films may be impaired, while if it exceeds 1000000, the dispersant is hard to handle because of its extremely high viscosity. For this reason, the number-average molecular weight of the methacrylic copolymer particularly desirably ranges from 6000 to 50000. The molecular weight of the copolymer may easily be controlled through the use of a polymerization regulator such as an alkyl mercaptan.

The methacrylic copolymer according to the present invention is a compound effective for uniformly dispersing pigments in paints. More specifically, the copolymer can be dissolved in a solvent such as xylene, may thus serve as a dispersant for pigments used in non-aqueous paints and permits uniform dispersion of, for instance, carbon black in paints. Therefore, the methacrylic copolymer and hence the dispersant of the present invention can ensure excellent coating operations and permit the formation of coated films exhibiting glossy feeling and free of any mottle, as compared with the conventional paints.

DETAILED DESCRIPTION OF THE INVENTION

The present invention will hereinafter be described in more detail with reference to the following Examples.

EXAMPLE 1

To an apparatus equipped with a reflux condenser, a thermometer, a stirring machine and a tank for dropwise addition, there was added 50 parts by weight of xylene and the temperature of the xylene was maintained at 100° C., followed by dropwise addition, in a nitrogen gas atmosphere, of a mixed solution comprising 30 parts by weight of ethyl acrylate, 5 parts by weight of Macromonomer AA-6 (a methyl methacrylate macromonomer; available from Toagosei Chemical Industry Co., Ltd.), 15 parts by weight of Light Ester DQ-100 (a quaternary product of dimethylaminoethyl methacrylate, available from Kyoei Chemical Co., Ltd.), 0.5 part by weight of dodecyl mercaptan and 1 part by weight of azobisisobutyronitrile to the xylene over 3 hours. After completion of the addition, 0.5 part by weight of azobisisobutyronitrile was additionally added and the reaction was continued for 2 hours at 100° C. to give a methacrylic copolymer. The number-average molecular weight of the resulting copolymer was determined by the gel permeation chromatography and it was found to be 43000.

Then a paint base was prepared by admixing 82 part by weight of Acrydick A-801 (an acryl polyol resin; content of non-volatile matter: 50%; solvent: toluene, butyl acetate; hydroxyl value: 50; available from Dainippon Ink and Chemicals Inc.), 3.5 parts by weight of FW-200 (available from Degsa Company) as carbon black, 14.5 parts by weight of a thinner (xylene/butyl acetate=70/30) and 1.05 part by weight of the foregoing methacrylic copolymer. The specific production processes for the base are as follows.

To a 225 ml volume glass bottle, there were added 34 g of Acrydick A-801, 4.5 g of FW-200, 19.5 g of a thinner and 1.35 g of the methacrylic copolymer as well as 200 g of glass beads having a diameter ranging from 1.5 to 2.0 mm followed by stirring them for one hour using a paint shaker (available from Red Devil Company). After one hour, additional 71.6 g of Acrydick A-801 was added to the mixture, then the resulting mixture was subjected to let down, followed by removal of the glass beads through filtration to thus complete the preparation of the base.

Separately, the same procedures used above were repeated except that BP-1300 (available from Cavot Company) was substituted for the FW-200 used above to give another base. These two kinds of bases were inspected for the viscosity, the particle size distribution, the cohesion of pigments and the gloss of the resulting coated films. The hardening agent herein used was Sumijule N-75 (available from Sumitomo Bayer Urethane Co., Ltd.).

The viscosity was determined by the following method. It was evaluated by determining shearing rates per 1.92 sec, 19.2 sec and 192 sec using a cone-plate type viscometer (E Type, available from Toki Mech Co., Ltd.).

The particle size distribution was determined by the following method, i.e., this was evaluated through the determination of particle sizes observed when 10%, 50% and 90% of the particles passed through a measuring device, i.e., Microtruck (available from Lead & Northrup Company).

The cohesion of pigments was determined by the method which comprised introducing 10 g of a base into a 50 ml volume screw tube (having a diameter of 35 mm and a height of 78 mm), followed by sufficiently wetting the inner wall of the tube, allowing the tube to stand for 24 hours and observation of the inner wall of the tube to thus determine the presence or absence of the cohesion of the pigment thereon.

The gloss of the coated film was determined by the method comprising the steps of mixing 100 parts by weight of a base and 17.6 parts by weight of Sumijule N-75, diluting the mixture with a thinner while adjusting the viscosity of the mixture to 12 sec using Ford cup #4, spray-coating the diluted paint on a tinplate sheet using an air-spraying machine, air-drying the coated layer for 24 hours and then determining the gloss at an angle of 20° of the coated plate using a gloss meter to evaluate the gloss feeling of the coated film.

The evaluation results observed for the base comprising FW-200 as carbon black are likewise summarized in Table 1, while those observed for the base comprising BP-1300 as carbon black are likewise listed in Table 2.

EXAMPLE 2

The same procedures used in Example 1 were repeated except that the mixed solution to be dropwise added to xylene comprised 30 parts by weight of 2-ethylhexyl methacrylate, 5 parts by weight of methoxy diethylene glycol methacrylate, 5 parts by weight of Macromonomer AB-6 (a butyl acrylate Macromonomer available from Toagosei Chemical Industry Co., Ltd.), 10 parts by weight of Light Ester DQ-100 (a quaternary product of dimethylaminoethyl methacrylate available from Kyoei Chemical Co., Ltd.), one part by weight of dodecyl mercaptan and one part by weight of azobisisobutyronitrile to prepare a methacrylic copolymer. The number-average molecular weight of the copolymer was determined and found to be 21000.

Two kinds of bases comprising the methacrylic copolymer were likewise prepared and the resulting bases were inspected for the viscosity, the particle size distribution, the cohesion of pigments and the gloss of the resulting coated films, in the same manner used in Example 1.

The evaluation results observed for the base comprising FW-200 as carbon black are likewise summarized in weight of azobisisobutyronitrile to prepare a methacrylic copolymer. The number-average molecular weight of the copolymer was found to be 14000.

Two kinds of bases comprising the methacrylic copolymer were prepared and the resulting bases were inspected for the viscosity, the particle size distribution, the cohesion of pigments and the gloss of the resulting coated films, in the same manner used in Example 1.

The evaluation results observed for the base comprising FW-200 as carbon black are likewise summarized in Table 1, while those observed for the base comprising BP-1300 as carbon black are likewise listed in Table 2.

COMPARATIVE EXAMPLE 1

The same procedures used in Example 1 were repeated except that the mixed solution to be dropwise added to xylene comprised 25 parts by weight of butyl methacrylate, 10 parts by weight of Light Ester DQ-100, 15 parts by weight of dimethylaminoethyl methacrylate, 2.5 parts by weight of dodecyl mercaptan and one part by weight of azobisisobutyronitrile to prepare a methacrylic copolymer. The number-average molecular weight of the copolymer was determined and found to be 18000.

Two kinds of bases comprising the methacrylic copolymer were prepared and the resulting bases were inspected for the viscosity, the particle size distribution, the cohesion of pigments and the gloss of the resulting coated films, in the same manner used in Example 1.

The evaluation results observed for the base comprising FW-200 as carbon black are likewise summarized in Table 1, while those observed for the base comprising BP-1300 as carbon black are likewise listed in Table 2.

COMPARATIVE EXAMPLE 2

The same procedures used in Example 1 were repeated except that the mixed solution to be dropwise added to xylene comprised 46 parts by weight of lauryl methacrylate, 4 parts by weight of dimethylaminoethyl methacrylate, 0.5 parts by weight of dodecyl mercaptan and one part by weight of azobisisobutyronitrile to prepare a methacrylic copolymer. The number-average molecular weight of the copolymer was determined and found to be 32000.

Two kinds of bases comprising the methacrylic copolymer were prepared and the resulting bases were inspected for the viscosity, the particle size distribution, the cohesion of pigments and the gloss of the resulting coated films, in the same manner used in Example 1.

The evaluation results observed for the base comprising FW-200 as carbon black are summarized in Table 1, while those observed for the base comprising BP-1300 as carbon black are listed in Table 2.

COMPARATIVE EXAMPLE 3

The same procedures used in Example 1 were repeated except that the mixed solution to be dropwise added to xylene comprised 10 parts by weight of butyl methacrylate, 40 parts by weight of dimethylaminoethyl methacrylate, 0.5 parts by weight of dodecyl mercaptan and one part by weight of azobisisobutyronitrile to prepare a methacrylic copolymer. The number-average molecular weight of the copolymer was determined and found to be 24000.

Two kinds of bases comprising the methacrylic copolymer were prepared and the resulting bases were inspected for the viscosity, the particle size distribution, the cohesion of pigments and the gloss of the resulting coated films, in the same manner used in Example 1.

The evaluation results observed for the base comprising FW-200 as carbon black are summarized in Table 1, while those observed for the base comprising BP-1300 as carbon black are listed in Table 2.

COMPARATIVE EXAMPLE 4

Two kinds of bases were prepared by the same method used in Example 1 except that Disperbyk 160 (a cationic polyurethane polymer available from Big Chemie Company) was substituted for the methacrylic copolymer and the resulting bases were inspected for the viscosity, the particle size distribution, the cohesion of pigments and the gloss of the resulting coated films, in the same manner used in Example 1. The evaluation results observed for the base comprising FW-200 as carbon black are summarized in Table 1, while those observed for the base comprising BP-1300 as carbon black are listed in Table 2.

COMPARATIVE EXAMPLE 5

Two kinds of bases were prepared by the same method used in Example 1 except that Anti-tera U (a salt of a long chain polyaminoamide with a high molecular weight acid ester, available from Big Chemie Company) was substituted for the methacrylic copolymer and the resulting bases were inspected for the viscosity, the particle size distribution, the cohesion of pigments and the gloss of the resulting coated films, in the same manner used in Example 1. The evaluation results observed for the base comprising FW-200 as carbon black are summarized in Table 1, while those observed for the base comprising BP-1300 as carbon black are listed in Table 2.

Blank Test

A base as a blank was prepared by the same method used in Example 1 except that any methacrylic copolymer was not used at all and the resulting blank was inspected for viscosity, particle size distribution, cohesion of pigments and gloss of the resulting coated films, in the same manner used in Example 1. The evaluated results on the base comprising FW-200 as carbon black are likewise summarized in Table 1, while those observed for the base comprising BP-1300 as carbon black are likewise listed in Table 2.

TABLE 1

| Ex. No | Viscosity of Base (mPa · s) | | | Particle Size Distribution (μm) | | | Cohesion of Pigment | Result 20 Gloss Determination |
|---|---|---|---|---|---|---|---|---|
| | $1.92\ s^{-1}$ | $19.2\ s^{-1}$ | $192\ s^{-1}$ | 10% Pass | 50% Pass | 90% Pass | | |
| 1 | 250 | 152 | 98.5 | 0.20 | 0.35 | 0.50 | not observed | 92.2 |
| 2 | 150 | 92.5 | 85.0 | 0.15 | 0.25 | 0.33 | not observed | 92.5 |
| 3 | 180 | 135 | 92.3 | 0.18 | 0.32 | 0.45 | not observed | 92.0 |
| 1* | 850 | 320 | 200 | 0.20 | 0.50 | 1.05 | observed | 88.5 |
| 2* | 1500 | 640 | 420 | 0.32 | 0.93 | 2.25 | observed | 85.2 |
| 3* | 820 | 505 | 310 | 0.22 | 0.48 | 0.95 | observed | 87.0 |
| 4* | 1950 | 696 | 512 | 0.39 | 0.90 | 3.04 | observed | 83.2 |
| 5* | 6140 | 1450 | 649 | 0.68 | 2.25 | 5.38 | observed | 80.1 |
| Blank | 3280 | 860 | 541 | 0.28 | 0.98 | 2.36 | observed | 87.7 |

*Comparative Example

TABLE 2

| Ex. No | Viscosity of Base (mPa · s) | | | Particle Size Distribution (μm) | | | Cohesion of Pigment | Result of 20° Gloss Determination |
|---|---|---|---|---|---|---|---|---|
| | $1.92\ s^{-1}$ | $19.2\ s^{-1}$ | $192\ s^{-1}$ | 10% Pass | 50% Pass | 90% Pass | | |
| 1 | 540 | 370 | 355 | 0.25 | 0.48 | 0.75 | not observed | 88.0 |
| 2 | 495 | 343 | 330 | 0.22 | 0.40 | 0.63 | not observed | 88.5 |
| 3 | 520 | 360 | 350 | 0.24 | 0.45 | 0.72 | not observed | 88.2 |
| 1* | 850 | 615 | 365 | 0.42 | 0.95 | 1.83 | observed | 84.8 |
| 2* | 1050 | 640 | 410 | 0.78 | 1.66 | 3.85 | observed | 81.2 |
| 3* | 960 | 625 | 400 | 0.38 | 0.90 | 1.78 | observed | 82.8 |
| 4* | 1740 | 659 | 453 | 0.52 | 1.35 | 3.10 | observed | 80.4 |
| 5* | 3480 | 969 | 520 | 1.36 | 2.52 | 6.03 | observed | 83.1 |
| Blank | 1020 | 553 | 366 | 0.58 | 1.94 | 6.87 | observed | 85.1 |

*Comparative Example

As seen from the results listed in Tables 1 and 2, the paints of Examples 1 to 3 each exhibited a low viscosity and a narrow particle size distribution as compared with those observed for the paints of Comparative Examples 1 to 5 and Blanks. Moreover, the former did not cause any cohesion of the pigment on the inner wall of the bottle and the resulting coated films were improved in the gloss. Accordingly, it is confirmed that the methacrylic copolymers prepared in Examples 1 to 3 are effective for use as dispersants for pigments.

What is claimed is:

1. A methacrylic copolymer comprising repeating units derived from the following monomers:

A) at least one (meth)acryl monomer selected from the group consisting of alkyl (meth)acrylates each carrying an alkyl group having 1 to 18 carbon atoms; alkenyl (meth)acrylates each carrying an alkenyl group having 1 to 18 carbon atoms; hydroxyalkyl (meth)acrylates each carrying an alkyl group having 2 to 4 carbon atoms; alkyl monoalkylene glycol (meth)acrylates and alkyl polyalkylene glycol (meth)acrylates each carrying an alkyl group having 1 to 18 carbon atoms; alkenyl monoalkylene glycol (meth)acrylates and alkenyl polyalkylene glycol (meth)acrylates each carrying an alkenyl group having 1 to 18 carbon atoms; and alkylalkenyl monoalkylene glycol (meth)acrylates and alkylalkenyl polyalkylene glycol (meth)acrylates each carrying an alkylalkenyl group having 1 to 18 carbon atoms;

(B) an aminoalkyl (meth)acrylate monomer represented by the following Formula (I):

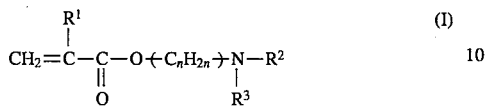

(wherein $R^1$ represents a hydrogen atom or a methyl group, $R^2$ and $R^3$ each represents a hydrogen atom or an alkyl group having 1 to 6 carbon atoms and n is an integer ranging from 2 to 8), and/or a quaternary ammonium (meth)acrylate monomer represented by the following Formula (II):

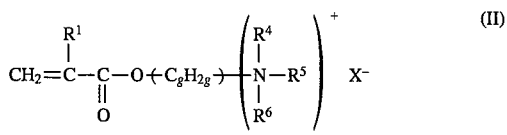

(wherein $R^4$, $R^5$ and $R^6$ which are different from one another and each represents an alkyl group having 1 to 6 carbon atoms, a hydroxyalkyl group having 2 to 6 carbon atoms, an alkoxyalkyl group having 1 to 4 carbon atoms, a cycloalkyl group, an aralkyl group, a phenyl group or a phenyl group substituted with other atoms; $X^-$ represents a halide ion or an anionic residue of an acid; and g is an integer ranging from 2 to 8) and (C) at least one monomer selected from the group consisting of polyalkyl (meth)acrylate macromonomers, polyalkenyl (meth)acrylate macromonomers, polyester macromonomers and polystyrene macromonomers, each carrying a terminal (meth)acryloyl group;

the copolymer having a content of the moieties derived from the monomer (A) ranging from 10 to 85 parts by weight, a content of the moieties derived from the monomer (B) ranging from 10 to 60 parts by weight and a content of the moieties derived from the monomer (C) ranging from 5 to 30 parts by weight and a number-average molecular weight ranging from 4000 to 1000000.

2. The methacrylic Copolymer of claim 1 wherein it has a number-average molecular weight ranging from 6000 to 50000.

3. A dispersant for dispersing pigments in non-aqueous paints and varnishes comprising a methacrylic copolymer which comprises repeating units derived from the following monomers:

(A) at least one (meth)acryl monomer selected from the group consisting of alkyl (meth)acrylates each carrying an alkyl group having 1 to 18 carbon atoms; alkenyl (meth)acrylates each carrying an alkenyl group having 1 to 18 carbon atoms; hydroxyalkyl (meth)acrylates each carrying an alkyl group having 2 to 4 carbon atoms; alkyl monoalkylene glycol (meth)acrylates and alkyl polyalkylene glycol (meth)acrylates each carrying an alyl group having 1 to 18 carbon atoms; alkenyl monoalkylene glycol (meth)acrylates and alkenyl polyalkylene glycol (meth)acrylates each carrying an alkenyl group having 1 to 18 carbon atoms; and alkylalkenyl monoalkylene glycol (meth)acrylates and alkylalkenyl polyalkylene glycol (meth)acrylates each carrying an alkylalkenyl group having 1 to 18 carbon atoms;

(B) an aminoalkyl (meth)acrylate monomer represented by the following Formula (I):

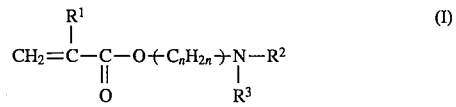

(wherein $R^1$ represents a hydrogen atom or a methyl group, $R^2$ and $R^3$ each represents a hydrogen atom or an alkyl group having 1 to 6 carbon atoms and n is an integer ranging from 2 to 8), and/or a quaternary ammonium (meth)acrylate monomer represented by the following Formula (II):

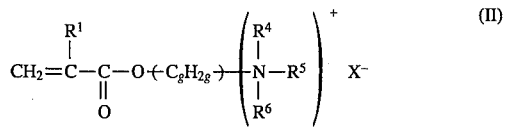

(wherein $R^4$, $R^5$ and $R^6$ which are different from one another and each may represent an alkyl group having 1 to 6 carbon atoms, a hydroxyalkyl group having 2 to 6 carbon atoms, an alkoxyalkyl group having 1 to 4 carbon atoms, a cycloalkyl group, an aralkyl group, a phenyl group or a phenyl group substituted with other atoms; $X^-$ represents a halide ion or an anionic residue of an acid; and g is an integer ranging from 2 to 8) and (C) at least one monomer selected from the group consisting of polyalkyl (meth)acrylate macromonomers, polyalkenyl (meth)acrylate macromonomers, polyester macromonomers and polystyrene macromonomers, each carrying a terminal (meth)acryloyl group;

and which has a content of the moieties derived from the monomer (A) ranging from 10 to 85 parts by weight, a content of the moieties derived from the monomer (B) ranging from 10 to 60 parts by weight and a content of the moieties derived from the monomer (C) ranging from 5 to 30 parts by weight and a number-average molecular weight ranging from 4000 to 1000000.

4. The dispersant for dispersing pigments in non-aqueous paints and varnishes as set forth in claim 3 wherein it comprises the methacrylic copolymer having a number-average molecular weight ranging from 6000 to 50000.

* * * * *